(12) United States Patent
Ikeyama

(10) Patent No.: US 7,212,341 B2
(45) Date of Patent: *May 1, 2007

(54) ANTIREFLECTION FILM, AND IMAGE DISPLAY DEVICE

(75) Inventor: Akihiro Ikeyama, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/472,469

(22) PCT Filed: Mar. 18, 2002

(86) PCT No.: PCT/JP02/02550

§ 371 (c)(1),
(2), (4) Date: Apr. 8, 2004

(87) PCT Pub. No.: WO02/075373

PCT Pub. Date: Sep. 26, 2002

(65) Prior Publication Data

US 2004/0156110 A1 Aug. 12, 2004

(30) Foreign Application Priority Data

Mar. 21, 2001 (JP) .............................. 2001-80691

(51) Int. Cl.
*G02B 1/10* (2006.01)
*B32B 5/16* (2006.01)

(52) U.S. Cl. ...................... 359/582; 428/141; 428/332; 428/323

(58) Field of Classification Search ................ 359/580, 359/586, 609, 582; 428/323, 328, 320, 213, 428/208, 332, 141, 331; 349/137, 96; 430/270.1
See application file for complete search history.

(56) References Cited

U.S. PATENT DOCUMENTS

| 5,291,536 A * | 3/1994 | Itoh et al. ..................... 378/35 |
| 5,747,152 A * | 5/1998 | Oka et al. .................... 428/323 |
| 6,319,594 B1 * | 11/2001 | Suzuki et al. ............... 428/208 |
| 6,693,746 B1 * | 2/2004 | Nakamura et al. .......... 359/580 |
| 2001/0050741 A1 * | 12/2001 | Hokazono et al. .......... 349/137 |

FOREIGN PATENT DOCUMENTS

| JP | 7-92306 | 4/1995 |
| JP | 7-168006 | 7/1995 |
| JP | 2000-258606 | 9/2000 |
| JP | 2000-275404 | 10/2000 |

* cited by examiner

*Primary Examiner*—Audrey Chang
(74) *Attorney, Agent, or Firm*—Buchanan Ingersoll & Rooney PC

(57) ABSTRACT

Provided is an antireflection film comprising a transparent support, at least one high refractive index layer having a refractive index higher by 0.05 or greater but not greater than 1.5 than that of the transparent support and a low refractive index layer having a refractive index lower by 0.05 or greater but not greater than 2.0 than that of the high refractive index layer, wherein the high refractive index layer contains matting agent particles having an average particle size of 0.3 μm or greater but not greater than 20 μm; and the film has a haze value of 10% or less. This antireflection film has a low reflectance, is clear, has a surface less tinged with white and has reduced color due to interference, so that it is suitably used for image display devices such as cathode ray tube display device (CRT), plasma display panel (PDP) and liquid crystal display (LCD). The film is also used for a polarizing plate.

7 Claims, 2 Drawing Sheets

ANTIREFLECTION FILM, AND IMAGE DISPLAY DEVICE

TECHNICAL FIELD

The present invention relates to an antireflection film which is clear, has a surface not so tinged with white and is improved to have less interference unevenness; and an image display device using the film.

BACKGROUND ART

In image display devices such as cathode ray tube display device (CRT), plasma display panel (PDP) and liquid crystal display device (LCD), in order to prevent a deterioration in the contrast or reflection by the display due to reflection of external light, antireflection films are usually disposed on the outermost surface of the display as a film for reducing a reflectance based on the principle of optical interference.

As a method of forming antireflection films, generally known is a method of applying an optically functional layer to a transparent support. For the purpose of antireflection, a reflectance can be reduced, for example, by disposing a layer (low refractive index layer) having a lower refractive index than that of the transparent support, or disposing a high refractive index layer over the transparent support and then laying the low refractive index layer over the high refractive index layer. Antireflection films formed by such coating method are suited for mass production, because they can be produced continuously.

In antireflection films having, over a transparent support, only a layer (low refractive index layer) having a refractive index lower than that of the transparent support, however, the refractive index of the low refractive index layer must be reduced sufficiently in order to reduce the reflectance of the antireflection films. For example, in an antireflection film having triacetyl cellulose as a support and a UV curable film of dipentaerythritol hexaacrylate as a hard coat layer having a low refractive index, the refractive index must be reduced to 1.40 or less in order to adjust an average reflectance at 450 nm to 650 nm to 1.6% or less. As a material having a refractive index of 1.40 or less, magnesium fluoride and calcium fluoride can be given as examples of inorganic materials, while fluorine-containing compounds having a large fluorine content can be given as examples of organic materials. Since fluorine compounds lack cohesive power, a film available therefrom has not sufficient scratch resistance as a film to be disposed on the uppermost surface of a display. For the formation of a film having sufficient scratch resistance, therefore, a compound having a refractive index of 1.43 or greater is required.

The above-described problems can be overcome by increasing the refractive index of a layer underlying the low refractive index layer, that is, adopting a structure in which a high refractive index layer is disposed over a transparent support and a low refractive index layer is then laid over the high refractive index layer. For example, an antireflection film having a low refractive index layer disposed over a transparent support via a hard coat layer is described in Japanese Patent Laid-Open No. Hei 7-287102. Also described in it is that the reflectance can be reduced by increasing the refractive index of the hard coat layer.

DISCLOSURE OF THE INVENTION

In such antireflection films having a high refractive index layer and a low refractive index layer stacked one after another, interference unevenness tends to appear owing to a difference in a refractive index between the high refractive index layer and support. This interference unevenness leads to a quality-wise problem, because it is visualized as an irregular color of the film.

An object of the present invention is to provide an antireflection film having a low reflectance and less interference unevenness, or an image display device using this antireflection film.

The above-described object of the present invention was attained by the below-described means.

1. An antireflection film comprising a transparent support, at least one high refractive index layer having a refractive index higher by 0.05 or greater but not greater than 1.5 than that of the transparent support and a low refractive index layer having a refractive index lower by 0.05 or greater but not greater than 2.0 than that of the high refractive index layer, wherein:

the high refractive index layer contains matting agent particles having an average particle size of 0.3 μm or greater but not greater than 20 μm; and the film has a Haze value of 10% or less.

2. An antireflection film as described above in 1, wherein the film thickness of the high refractive index layer is 70% or greater but not greater than 200% of the average particle size of the matting agent particles.

3. An antireflection film as described above in 1 or 2, wherein the number of the matting agent particles which protrude from the high refractive index layer falls within a range of from 5000 particles/mm² or greater but not greater than 100000 particles/mm².

4. An antireflection film as described above in 3, wherein the number of the matting agent particles which protrude from the high refractive index layer falls within a range of from 8000 particles/mm² or greater but not greater than 40000 particles/mm².

5. An antireflection film as described above in any one of 1 to 4, wherein the value S expressing the particle size distribution of the matting agent particles and calculated from the following equation (I):

$$S=[D(0.9)-D(0.1)]/D(0.5) \qquad \text{Equation (I):}$$

wherein in the formula (I), D(0.1), D(0.5) and D(0.9) are as defined below:

D(0.1): 10% of the integrated value of the volume-equivalent particle size

D(0.5): 50% of the integrated value of the volume-equivalent particle size

D(0.9): 90% of the integrated value of the volume-equivalent particle size is 1.5 or less.

6. An antireflection film as described above in 5, wherein the value S indicating the particle size distribution is 1.1 or less.

7. An antireflection film as described above in 6, wherein the film thickness of the high refractive index layer is 80% or greater but not greater than 120% of the average particle size of the matting agent particles.

8. An antireflection film as described above in any one of 1 to 7, wherein a surface roughness Ra on the surface of the antireflection film over which the high refractive index layer and the low refractive index layer have been disposed by coating is 0.003 μm or greater but not greater than 0.10 μm.

9. An antireflection film as described above in any one of 1 to 8, wherein the refractive index of the matting agent particles falls within a range of ±0.05 of the refractive index of the high refractive index layer.

10. An antireflection film as described above in any one of 1 to 9, wherein the refractive index of the high refractive index layer is 1.6 or greater but not greater than 2.0.

11. An antireflection film as described above in any one of 1 to 10, wherein the internal haze of the high refractive index layer is 2% or less.

12. An antireflection film as described above in any one of 1 to 11, wherein the transparent support is made of triacetyl cellulose.

13. A polarizing plate having, over at least one side thereof, an antireflection film as described above in any one of 1 to 12.

14. An image display device, which comprises, over an image display surface thereof, an antireflection film having a transparent support, at least one high refractive index layer having a refractive index higher by 0.05 or greater than that of the transparent support and a low refractive index layer having a refractive index lower by 0.05 or greater than that of the high refractive index layer, wherein the high refractive index layer contains matting agent particles having an average particle size of 0.3 μm or greater but not greater than 20 μm; and the film has a haze value of 10% or less.

BEST MODE FOR CARRYING OUT THE INVENTION

A principal constitution of the antireflection film of the present invention will hereinafter be described with reference to the accompanying drawings.

FIG. 1 is a schematic cross-sectional view illustrating a main layer constitution of the antireflection film.

The mode illustrated in (a) of FIG. 1 has a layer constitution of a transparent support 1, a high refractive index layer 2 and a low refractive index layer in the order of mention. The high refractive index layer 2 contains matting agent particles 2 therein.

The transparent support 1, high refractive index layer 2 and low refractive index layer 3 each has a refractive index satisfying the below-described relations.

Figure 1A:
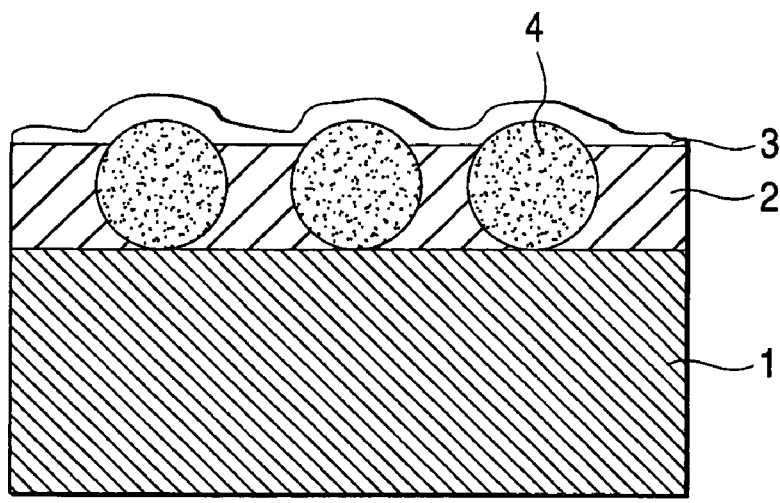
FIG. 1 is a schematic cross-sectional view illustrating a main layer constitution of an antireflection film.

Refractive index of high refractive index layer>refractive index of transparent support Refractive index of high refractive index layer>refractive index of low refractive index layer In the antireflection film as illustrated in FIG. 1(a), the low refractive index layer satisfying the below-described equation (1) is preferred, because it contributes to heightening of the antireflective effects.

$$m\lambda/4 \times 0.7 < n_1 < m\lambda/4 \times 1.3 \quad \text{Equation (1)}$$

wherein, in the formula (1), m stands for a positive odd number (typically, 1), $n_1$ represents a refractive index of the low refractive index layer, and $d_1$ represents a film thickness (nm) of the low refractive index layer.

Figure 1B:
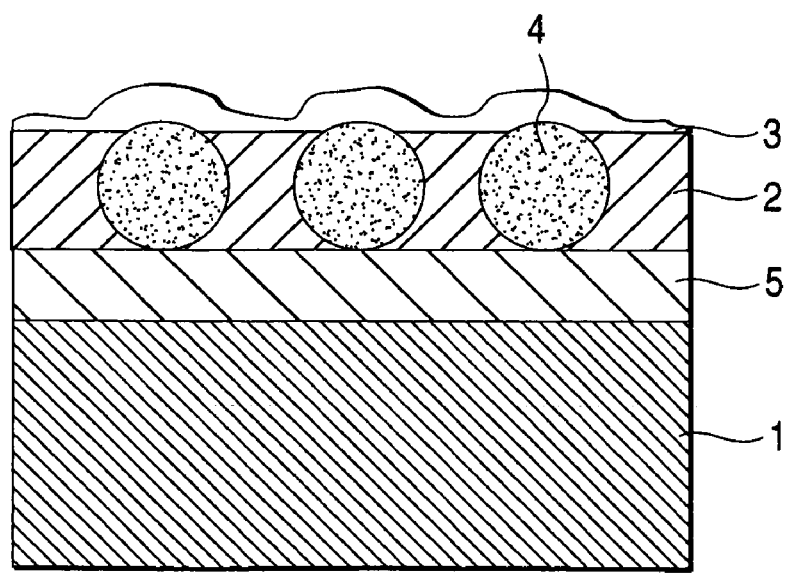
Figure 2:
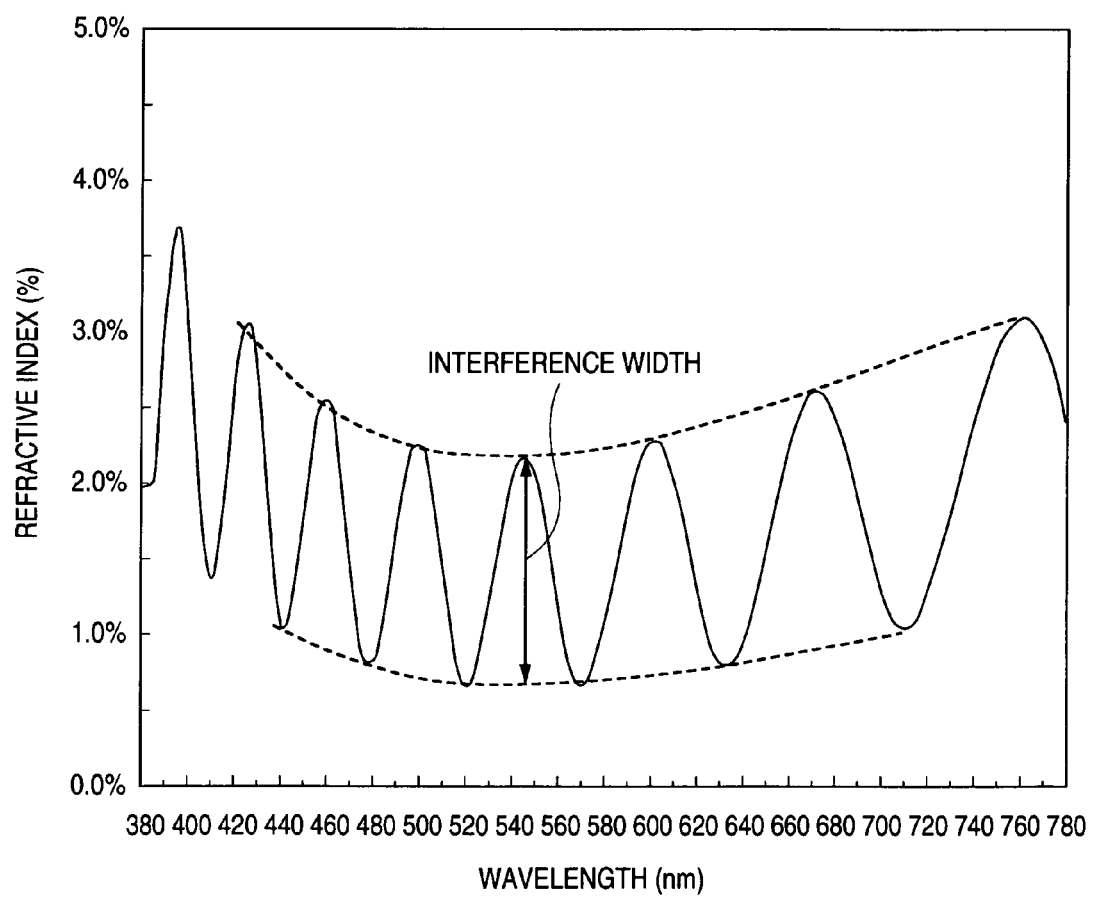
FIG. 2 illustrates measuring results of the dependence of a refractive index on wavelength and an interference width which is an index of the size of interference.

In the present invention, the mode as illustrated in FIG. 1(b) is also preferred. In FIG. 1(b), the antireflection film has a layer constitution of a transparent support 1, a hard coat layer 5, a high refractive index layer 2 and a low refractive index layer 3 in the order of mention. The high refractive index layer 2 contains matting agent particles 4. The hard coat layer 5, high refractive index layer 2 and low refractive index layer 3 each has a refractive index satisfying the below-described relation.

Refractive index of high refractive index layer>refractive index of hard coat layer Refractive index of high refractive index layer>refractive index of low refractive index layer It is also preferred that the refractive index of the high refractive index layer of the present invention cannot be expressed by only one value, but the layer may be an uneven refractive index layer with particles dispersed in the material forming the high refractive index layer. In this case, the refractive index of the layer is expressed by an average refractive index of the matrix portion (in the present invention, this means a portion made of the material except the matting agent particles). The material forming the high refractive index layer preferably has a refractive index ranging from 1.50 to 2.80.

It is described in Japanese Patent Application Laid-Open No. Hei 8-110401 that when a high refractive index material has a monomer having at least two ethylenically unsaturated groups and fine particles made of at least one oxide of a metal selected from titanium, aluminum, indium, zinc, tin and antimony and having a particle size of 100 nm or less, no scattering occurs because the particle size of the fine particles is sufficiently smaller than the wavelength of light and it optically behaves as a uniform substance.

[Transparent Support]

Use of a plastic film as the transparent support is preferred. Examples of a polymer forming the plastic film include cellulose esters (such as triacetyl cellulose and diacetyl cellulose), polyamide, polycarbonate, polyesters (such as polyethylene terephthalate and polyethylene naphthalate), polystyrene, polyolefin and polynorbornenes (trade name; Arton and Zeonex).

Of these, triacetyl cellulose, polyethylene terephthalate, polyethylene naphthalate and polynorbornene are preferred, with triacetyl cellulose being particularly preferred.

The polymer material used for the transparent support has preferably a refractive index within a range of from 1.4 to 1.7. With regards to the refractive index of the above-described polymers, that of cellulose esters is about 1.4 to 1.5 and that of polyesters is about 1.5 to 1.7.

Use of the antireflection film of the present invention for a liquid crystal display device is especially preferred. When it is used for the liquid crystal display device, it is disposed on the uppermost surface of the display, for example, by disposing an adhesive layer on one side of the device. When the transparent support is made of triacetyl cellulose, triacetyl cellulose is used as a film for protecting the deflecting layer of a polarizing plate. Use of the antireflection film of the present invention which has antidazzling property as a protecting film is especially preferred from a cost point of view.

As the triacetyl cellulose film, that formed by either one of single-layer flow casting or plural-layer co-flow casting of a triacetyl cellulose dope which has been prepared by dissolving triacetyl cellulose in a solvent is preferred. From the viewpoint of environmental preservation, a triacetyl cellulose film formed using a triacetyl cellulose dope, which has been prepared by dissolving triacetyl cellulose in a solvent substantially free of dichloromethane by a low-temperature dissolving method or a high-temperature dissolving method which will be described later, is particularly preferred.

A triacetyl cellulose made of a single layer is prepared by drum casting or band casting as disclosed in Japanese Patent Application Laid-Open No. Hei 7-11055, while a triacetyl cellulose made of a multiple layer is prepared by so-called co-casting as disclosed in Japanese Patent Application Laid-Open No. Sho 61-94725, Japanese Patent Publication No. Sho 62-43846 or the like. Described specifically, raw material flakes are dissolved in a solvent such as halogenated hydrocarbon (such as dichloromethane), alcohol (such as methanol, ethanol or butanol), ester (such as methyl formate or methyl acetate) or ether (such as dioxane, dioxolane or diethylene ether). To the resulting solution, an additive such as plasticizer, ultraviolet absorber, deterioration preventive, lubricant and/or release accelerator is added to the resulting solution as needed. The resulting solution (which will hereinafter be called "dope") is cast over a support made of a horizontal type endless metal belt or a rotary drum by dope feeding means (which will hereinafter be called "die"). When a single layer is desired, a single layer casting of a single dope is carried out, while when a multilayer is desired, a low-concentration dope is co-cast over both sides of a high-concentration cellulose ester dope. After the film dried over the support to some extent and thereby imparted with rigidity is released from the support, the film is caused to pass through a dry zone by using a carrying means to remove the solvent.

Dichloromethane is a typical solvent for dissolving triacetyl cellulose therein. Halogenated hydrocarbons such as dichloromethane are usable without any technical problem, but in view of the global environment or working environment, the solvent substantially free of a halogenated hydrocarbon such as dichloromethane is preferred. The term "substantially free" as used herein means that a percentage of the halogenated hydrocarbon in the organic solvent is less than 5% by mass (preferably less than 2% by mass).

For the preparation of a triacetyl cellulose dope by using a solvent substantially free of dichloromethane or the like, use of a special dissolution method as described below becomes inevitable.

A first dissolution method which is called "cooling dissolution method" will be described below.

Triacetyl cellulose is added in portions to a solvent at a temperature (−10 to 40° C.) near room temperature while stirring. The mixture of triacetyl cellulose and the solvent is then cooled to −100 to −10° C. (preferably from −80 to −10° C., more preferably from −50 to −20° C., most preferably from −50 to −30° C.). The cooling can be conducted in a dry ice-methanol bath (−75° C.) or in a cooled diethylene glycol solution (−30 to −20° C.). This cooling solidified the mixture of triacetyl cellulose and solvent. The solid mixture thus obtained is then heated to 0 to 200° C. (preferably from 0 to 150° C., more preferably from 0 to 120° C., most preferably from 0 to 50° C.), whereby a solution having triacetyl cellulose flowing in the solvent is obtained. The heating may be attained by allowing the solid mixture to stand at room temperature or may be heated in a warm bath.

A second method which is called "high-temperature dissolution method" will next be described.

First, triacetyl cellulose is added in portions to a solvent at a temperature (−10 to 40° C.) near room temperature while stirring. The triacetyl cellulose solution of the present invention is preferably obtained by swelling, with triacetyl cellulose, a mixed solvent containing various solvents. In this method, the concentration of triacetyl cellulose in the mixed solvent is preferably 30% by mass or less, but it is preferably as high as possible when the drying efficiency upon film formation is taken into consideration. The mixture of triacetyl cellulose and the mixed solvent is then heated to 70 to 240° C. (preferably 80 to 220° C., more preferably 100 to 200° C., most preferably 100 to 190° C.) under pressure of 0.2 MPa to 30 MPa. Since the heated solution cannot be applied as is, it must be cooled to a temperature not greater than the boiling point of the solvent having the lowest boiling point among the solvents employed. In this case, it is the common practice to cool the solution to −10 to 50° C. and cause the pressure to return to a normal pressure. Cooling may be conducted only by allowing a high-pressure high-temperature container or line housing the triacetyl cellulose solution to stand at room temperature or by cooling such an apparatus with a refrigerant such as cooling water.

The triacetyl cellulose film formed in the above-described manner is preferable, because it does not generate much chips upon processing compared with films formed in the conventional manner.

The transparent support preferably has a light transmittance of 80% or greater, more preferably 86% or greater; preferably has a haze of 2.0% or less, more preferably 1.0% or less; and preferably has a refractive index within a range of 1.4 to 1.7.

The transparent support of the present invention preferably has a film thickness of 10 µm or greater but not greater than 300 µm, more preferably 20 µm or greater but not greater than 200 µm, still more preferably 30 m or greater but not greater than 120 µm. Particularly in a portable image display device for which thinness is one requirement, the transparent support having a thickness of 60 µm or less is preferred.

The transparent support preferably has, disposed thereover, an undercoat layer, antistatic layer, mat layer, slipping layer or the like in order to impart it with functionality.

[Hard Coat Layer]

In the antireflection film of the present invention, a hard coat layer may be disposed as needed between the transparent support and the low refractive-index layer in order to improve the film strength. The strength of the hard coat layer is preferably H or greater in pencil hardness, more preferably 2H or greater, especially preferably 3H or greater. The refractive index of the hard coat layer of the present invention can be adjusted, depending on the refractive index of a layer thereover or the transparent support. The refractive index preferably ranges from 1.45 to 1.70.

As a compound used for a binder of the hard coat layer, polymers having a saturated hydrocarbon or a polyether as a main chain are preferred, of which those having a saturated hydrocarbon as a main chain are more preferred. The binder polymer preferably has a crosslinked structure. The polymer having a saturated hydrocarbon as a main chain is preferably obtained by polymerization reaction of an ethylenically unsaturated monomer. In order to obtain a crosslinked binder polymer, use of a monomer having at least two ethylenically unsaturated monomers is preferred. In order to increase the refractive index of the hard coat layer, incorporation of at least one ring or atom selected from aromatic rings, halogen atoms except fluorine, and atoms such as sulfur, phosphorus and nitrogen in the structure of the monomer is preferred.

Examples of the monomer having at least two ethylenically unsaturated monomers include esters of a polyol and (meth)acrylic acid (such as ethylene glycol di(meth)acrylate 1,4-dichlorohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta (meth)acrylate; pentaerythritol hexa(meth)acrylate, 1,2,3-cyclohexane tetra(meth)acrylate, polyurethane polyacrylate, and polyester polyacrylate), vinyl benzene and derivatives thereof (such as 1,4-divinylbenzene, 4-(vinylbenzoic acid)-2-acryloylethyl ester, and 1,4-divinylcyclohexanone), vinylsulfones (such as divinylsulfone), acrylamides (such as methylenebisacrylamide) and methacrylamide.

Specific examples of the high refractive index monomer include bis(4-methacryloylthiophenyl)sulfide, vinyl naphthalene, vinylphenyl sulfide, and 4-methacryloxyphenyl-4'-methoxyphenylthioether.

The polymer having a polyether as a main chain is preferably synthesized by the ring-opening polymerization of a polyfunctional epoxy compound.

After application, the monomer having these ethylenically unsaturated groups is cured by the polymerization reaction by ionizing radiation or heat.

Of the polymerization reactions of the polyfunctional monomer, that using a photopolymerization initiator is particularly preferred. Examples of the photopolymerization initiator include acetophenones, benzophenones, Michler's benzoyl benzoate, α-amyloxyme ester, tetramethylthiuram monosulfide and thioxanthones.

In addition to the photopolymerization initiator, a photosensitizer may be employed. Examples of the photosensitizer include n-butylamine, triethylamine, tri-n-butylphosphine, Michler's ketone and thioxanthone.

The photopolymerization initiator is added preferably in an amount ranging from 0.1 to 15 parts by mass relative to 100 parts by mass of the polyfunctional monomer, with a range of from 1 to 10 parts by mass being more preferred. The photopolymerization reaction is preferably carried out by exposing the hard coat layer to ultraviolet rays after application and drying.

Instead of or in addition to the monomer having at least two ethylenically unsaturated groups, a crosslinked structure may be introduced into the binder polymer by the reaction of a crosslinkable group.

Examples of the crosslinkable functional group include an isocyanate group, an epoxy group, an aziridine group, an oxazoline group, an aldehyde group, a carbonyl group, a hydrazine group, a carboxyl group, a hydroxy group, a methylol group, an active methylene group and metal alkoxide groups such as alkoxysilyl group. Vinylsulfonic acid, an acid anhydride, a cyanoacrylate derivative, melamine, etherified methylol, an isocyanate compound or a metal alkoxide such as tetramethoxysilane can be added for introducing a crosslinked structure. A functional group which exhibits crosslinking property as a result of the decomposition reaction, such as block isocyanate group, may also be used. In the present invention, the crosslinkable group is not limited to the above-described ones but those exhibiting reactivity as a result of the decomposition of the above-described functional group may be used. Compounds having such a crosslinkable group must be crosslinked by heat or the like after application.

To the hard coat layer, inorganic fine particles may be added in order to heighten the curing strength of the film. As the inorganic particles, those having an average particle size of 0.5 μm or less, especially 0.2 μm or less are preferred.

Examples of the inorganic fine particles include silicon dioxide particles, titanium dioxide particles, zirconium dioxide particles, aluminum oxide particles, tin oxide particles, calcium carbonate particles, barium sulfate particles, talc, kaolin and calcium sulfate particles. Of these, silicon dioxide particles, titanium dioxide particles and aluminum oxide particles are particularly preferred. These fine particles are preferably surface-treated to increase stability in the coating solution and heighten the film strength.

The refractive index of the hard coat layer can be heightened. For this purpose, the hard coat layer preferably contains fine particles made of oxides with at least one metal selected from titanium, zirconium, aluminum, indium, zinc, tin and antimony and having a particle size of 100 nm or less, preferably 50 nm or less. Examples of the fine particles include $TiO_2$, $ZrO_2$, $Al_2O_3$, $In_2O_3$, $ZnO$, $SnO_2$, $Sb_2O_3$ and ITO.

The hard coat layer is preferably imparted with conductivity. For this purpose, addition of conductive inorganic fine particles is preferred. The conductive inorganic fine particles have preferably a particle size of 500 nm or less, preferably 100 nm or less, especially preferably 50 nm or less. Examples of the conductive inorganic fine particles include tin oxide, indium oxide, zinc oxide and titanium nitride, of which tin oxide and indium oxide are particularly preferred. The conductive inorganic fine particles have, as a principal component, an oxide or nitride of these metals and may contain another element. The term "principal component" means a component whose content (% by mass) is the greatest of all the components constituting the particles. Examples of the another element include Ti, Zr, Sn, Sb, Cu, Fe, Mn, Pb, Cd, As, Cr, Hg, Zn, Al, Mg, Si, P, S, B, Nb, In, V and halogen atoms. When tin oxide or indium oxide is employed, addition of Sb, P, B, Nb, In, V or a halogen atom is preferred in order to heighten the conductivity. As the conductive inorganic fine particles, Sb-containing tin oxide (ATO) and Sn-containing indium oxide (ITO) are particularly preferred. The percentage of Sb in ATO is preferably 3 to 30% by mass, while the percentage of Sn in ITO is preferably 5 to 20% by mass.

The inorganic fine particles is added to the hard coat layer preferably in an amount of from 10 to 90% by mass, more preferably from 20 to 80% by mass, especially preferably from 30 to 60% by mass based on the total mass of the hard coat layer. The thickness of the hard coat layer is preferably from 1 to 15 μm.

[High Refractive Index Layer]

In the present invention, a high refractive index layer is disposed over the transparent support or transparent support having thereover the hard coat layer in order to reduce a refractive index. The refractive index of the high refractive index layer in the present invention is set higher by 0.05 or greater but not greater than 1.5 than that of the transparent support.

The refractive index of the high refractive index layer is preferably from 1.55 to 2.30, more preferably from 1.57 to 2.10, especially preferably from 1.57 to 2.10, most preferably from 1.62 to 1.90.

The thickness of the high refractive index layer is preferably from 0.05 μm to 50 μm, more preferably from 0.1 μm to 20 μm, most preferably from 0.3 μm to 10 μm.

The high refractive index layer of the present invention may have a function as a hard coat layer and is preferably imparted with an equal level of strength to that of the hard coat layer. The strength of the high refractive index layer is HB or greater in terms of pencil hardness, more preferably H or greater, and especially preferably 2H or greater.

The high refractive index layer of the present invention preferably contains inorganic fine particles and a polymer.

A compound serving as a binder of the high refractive index layer is preferably a polymer having an unsaturated hydrocarbon or polyether as a main chain, with a polymer having an unsaturated hydrocarbon as a main chain being more preferred. The binder polymer has preferably a crosslinked structure. The polymer having an unsaturated hydrocarbon as a main chain is preferably prepared by the polymerization reaction of an ethylenically unsaturated monomer. The crosslinked binder polymer is preferably obtained by using a monomer having at least two ethylenically unsaturated groups. In order to increase the refractive index, incorporation of at least one ring or atom selected from aromatic rings, halogen atoms except fluorine, and atoms such as sulfur, phosphorus and nitrogen in the structure of the monomer is preferred.

Examples of the monomer having at least two ethylenically unsaturated monomers include esters of a polyol and (meth)acrylic acid (such as ethylene glycol di(meth)acrylate 1,4-dichlohexane diacrylate, pentaerythritol tetra(meth) acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta (meth)acrylate, pentaerythritol hexa(meth)acrylate, 1,2,3-cyclohexane tetra(meth)acrylate, polyurethane polyacrylate, and polyester polyacrylate), vinyl benzene and derivatives thereof (such as 1,4-divinylbenzene, 4-(vinylbenzoic acid)-2-acryloylethyl ester, and 1,4-divinylcyclohexanone), vinylsulfones (such as divinylsulfone), acrylamides (such as methylenebisacrylamide) and methacrylamides.

Specific examples of the high refractive index monomer include bis(4-methacryloylthiophenyl)sulfide, vinyl naphthalene, vinyl phenyl sulfide, and 4-methacryloxyphenyl-4'-methoxyphenylthioether.

The polymer having a polyether as a main chain is preferably synthesized by the ring-opening polymerization of a polyfunctional epoxy compound.

Use of a crosslinked polymer as a binder of the high refractive index layer of the present invention is also preferred. Introduction of the crosslinked structure imparts the polymer with a film forming capacity, thereby reinforcing the strength of the layer.

Examples of the main chain of the crosslinked polymer include polyolefins (saturated hydrocarbons), polyethers, polyureas, polyurethanes, polyesters, polyamines, polyamides, and melamine resins. The polyolefin main chain, polyether main chain, and polyurea main chain are preferred. More preferred are polyolefin main chain and polyether main chain, with the polyolefin main chain being most preferred.

The crosslinked polymer may contain an anionic group such as carboxylic acid group (carboxyl), sulfonic acid group (sulfo) and phosphoric acid group (phosphono). Of these, sulfonic acid group and phosphoric acid group are preferred as the anionic group. The anionic group may be in the form of a salt. The polymer having an anionic group preferably has a crosslinked structure in its main chain. The anionic group serves to maintain the dispersed state of the inorganic fine particles.

The polymer may further contain another recurring units (recurring units free of an anionic group and a crosslinked structure). As the another recurring unit, those having an amino group or a quaternary ammonium group and those having a benzene ring are preferred. Similar to the anionic group, the amino group or quaternary ammonium group serve to maintain the dispersed state of the inorganic fine particles.

As the monomer having an anionic group, or the monomer having an amino group or a quaternary ammonium group, commercially available monomers are usable.

Preferred examples of the commercially available anionic-group-containing monomer include "KAYAMAR PM-21 and PM-2" (each, produced by Nippon Kayaku Co., Ltd.), "Antox MS-60, MS-2N and MS-NH4" (each, produced by Nippon Nyukazai Co., Ltd.), "Aronix M-5000, M-6000 and M-8000 series" (each, produced by To a Gosei Kagaku Kogyo Co., Ltd.), "Biscoat #2000 series" (produced by of Osaka Organic Chemical Industry, Ltd.), "New Frontier GX-8289" (produced by Dai-ichi Kogyo Seiyaku Co., Ltd.), "NK Ester CB-1, and A-SA" (each, produced by Shin-Nakamura Chemical Co., Ltd.), and "AR-100, MR-100 and MR-200" (each, produced by Daihachi Kagaku Kogyo).

Preferred examples of the commercially available amino-containing or quaternary-ammonium-containing monomer include "DMAA" (produced by Osaka Organic Chemical Industry, Ltd.), "DMAEA, and DMAPAA" (each, produced by Kohjin Co., Ltd.), "Blemer QA" (produced by NOF), and "New Frontier C-1615" (produced by Dai-ichi Kogyo Seiyaku Co., Ltd.).

After application, these monomers having an ethylenically unsaturated monomer are cured by the polymerization reaction by ionizing radiation or heat.

For the formation of the polymer, photopolymerization or thermal polymerization reaction can be employed and the photopolymerization reaction is preferred.

For the polymerization reaction, use of a polymerization initiator is preferred. Examples include the above-described polymerization initiators and photopolymerization initiators.

Use of a photopolymerization initiator is particularly preferred for the polymerization reaction of the polyfunctional monomer. Examples of the photopolymerization initiator include acetophenones, benzophenones, Michler's benzoylbenzoate, α-amyloxyme ester, tetramethylthiuram monosulfide and thioxanthone. In addition to the photopolymerization initiator, a photosensitizer may be employed. Examples of the photosensitizer include n-butylamine, triethylamine, tri-n-butylphosphine Michler's ketone and thioxanthone.

The photopolymerization initiator is preferably used in an amount ranging from 0.1 to 15 parts by mass relative to 100 parts by mass of the polyfunctional monomer, with an amount ranging from 1 to 10 parts by mass being more preferred.

The photopolymerization reaction is preferably carried out by exposure to ultraviolet rays after application and drying of the high refractive index layer.

As the polymerization initiator, a commercially available one is usable. A polymerization accelerator may be used in addition to the polymerization initiator. The polymerization initiator and polymerization accelerator are preferably added in an amount ranging from 0.2 to 10% by mass based on the total amount of the monomer.

The polymerization of the monomer (or oligomer) may be accelerated by heating the coating solution (monomer-containing dispersion of inorganic fine particles). Or, the polymer thus formed may be subjected to additional thermosetting reaction by heating after application of the solution and photopolymerization.

Instead of or in addition to the monomer having at least two ethylenically unsaturated groups, a crosslinked structure may be introduced into the binder polymer by the reaction of a crosslinkable group. Examples of the crosslinkable functional group include an isocyanate group, an epoxy group, an aziridine group, an oxazoline group, an aldehyde group, a carbonyl group, a hydrazine group, a carboxyl group, a hydroxy group, a methylol group, an active methylene group and metal alkoxide groups such as alkoxysilyl group. A vinylsulfonic acid, an acid anhydride, a cyanoacrylate derivative, a melamine, an etherified methylol, an isocyanate compound, a metal alkoxide such as tetramethoxysilane, or the like can be used for introducing a crosslinked structure. A functional group which exhibits crosslinking property as a result of the decomposition reaction, such as block isocyanate group, may also be used.

In the present invention, the crosslinkable group is not limited to the above-described compounds but those exhibiting reactivity as a result of the decomposition of the above-described functional group may be used. Compounds having such a crosslinkable group must be crosslinked by heat or the like after application.

To the high refractive index layer, inorganic fine particles may be added to the binder in order to adjust the refractive index. Use of metal oxides or sulfides as these fine particles is preferred. Examples of the metal oxides or sulfides include titanium dioxide (e.g., of rutile, mixed crystal of rutile/anatase, anatase, amorphous structure), tin oxide, indium oxide, zinc oxide, zirconium oxide, aluminum oxide, antimony oxide, ITO and zinc sulfide. Of these, titanium oxide, zirconium oxide, tin oxide, and indium oxide are particularly preferred. The inorganic fine particles having, as a main component, the metal oxide or sulfide may contain another element. The term of "main component" means a component whose content (% by mass) is the greatest of all the constituents of the particles. Examples of the another element include Ti, Zr, Sn, Sb, Cu, Fe, Mn, Pb, Cd, As, Cr, Hg, Zn, Al, Mg, Si, P and S.

The inorganic fine particles to be used for the high refractive index layer preferably have a refractive index ranging from 1.50 to 2.80, with a range of from 1.60 to 2.80 being more preferred.

As well as the inorganic fine particles exhibiting a high refractive index, the high refractive index layer may contain another fine particles to impart the layer with improved strength and antistatic performance. Examples of such inorganic fine particles include silicon dioxide particles, aluminum oxide particles, tin oxide particles, calcium carbonate particles, barium sulfate particles, talc, kaolin and calcium sulfate particles.

In the present invention, the above-described inorganic fine particles may be subjected to surface treatment. The surface treatment is conducted using an inorganic compound or an organic compound. Examples of the inorganic compound to be used for the surface treatment include alumina, silica, zirconium oxide and iron oxide. Of these, alumina and silica are preferred. Examples of the organic compound to be used for the surface treatment include polyols, alkanolamines, organic phosphoric acid and salts thereof, stearic acid, silane coupling agents and titanate coupling agents. Of these, silane coupling agents are most preferred. Surface treatment may be conducted using two or more of these compounds in combination. The treatment may be conducted using the above-described ones.

The inorganic fine particles are preferably in the form of rice grain, sphere, cube, spindle or amorphous.

The primary particles of the inorganic fine particles preferably have a weight average particle size of from 1 to 100 nm, more preferably from 1 to 70 nm, most preferably from 1 to 50 nm.

The inorganic fine particles in the coating layer may exist as secondary particles. The secondary particles preferably have a weight average particle size of from 1 to 500 nm, more preferably from 5 to 200 nm, still more preferably from 10 to 100 nm. The average particle size of the inorganic fine particles can be measured by light scattering method or electron micrograph.

The specific surface area of the inorganic fine particles is preferably from 10 to 400 $m^2/g$, more preferably from 20 to 200 $m^2/g$, most preferably from 30 to 150 $m^2/g/$.

The amount of the inorganic fine particles is preferably from 10 to 90% by mass, more preferably from 20 to 80% by mass, especially preferably from 30 to 70% by mass, each based on the total mass of the high refractive index layer.

Two or more inorganic fine particles may be used in combination in the high refractive index layer.

For the high refractive index layer, use of a polymer having a relatively high refractive index is also preferred. Examples of the polymer having a high refractive index include polystyrene, styrene copolymer, polycarbonate, melamine resin, phenol resin, epoxy resin, and polyurethane available by the reaction between a cyclic (alicyclic or aromatic) isocyanate and polyol. The other polymers having a cyclic (aromatic, heterocyclic, or alicyclic) group and polymers having, as a substituent, a halogen atom other than fluorine also have a high refractive index. The polymer may be formed by the polymerization reaction of a monomer in which a double bond has been introduced to enable radical curing.

The high refractive index layer may be formed using an organometal compound having a film forming capacity. The organometal compound dispersible in a proper medium or in the form of a liquid is preferred. Examples of the organometal compounds include metal alcoholates (such as titanium tetraethoxide, titanium tetra-i-propoxide, titanium tetra-n-propoxide, titanium tetra-n-butoxide, titanium tetra-sec-butoxide, titanium tetra-tert-butoxide, aluminum triethoxide, aluminum tri-i-propoxide, aluminum tributoxide, antimony triethoxide, antimony tributoxide, zirconium tetraethoxide, zirconium tetra-i-propoxide, zirconium tetra-n-propoxide, zirconium tetra-n-butoxide, zirconium tetra-sec-butoxide, zirconium tetra-tert-butoxide), chelate compounds (such as di-isopropoxy titanium bisacetylacetonate, di-butoxy titanium bisacetylacetonate, di-ethoxy titanium bisacetylacetonate, bisacetylacetone zirconium, aluminum acetylacetonate, aluminum di-n-butoxide monoethylacetoacetate, aluminum di-i-propoxide monomethylacetoacetate, tri-n-butoxide zirconium monoethylacetoacetate), organic acid salts (such as zirconium ammonium carbonate), and active inorganic polymers composed mainly of zirconium.

In the present invention, addition of matting agent particles to the high refractive index layer brings about effects of light scattering or internal light scattering due to the surface roughness, thereby making it possible to reduce the influence of optical interference in the high refractive index layer which will otherwise occur owing to a difference in the refractive index between the support underlying the high refractive index layer and the refractive index layer. If the high refractive index layer does not contain matting agent particles, the dependence of reflectance on the wavelength greatly fluctuates due to the optical interference caused by the difference in the refractive index between the high refractive index layer and the transparent support, resulting in a deterioration in the antireflection effect and at the same time, occurrence of irregular color. In the antireflection film of the present invention, these problems are overcome by the addition of matting agent particles. Moreover, the surface roughness formed by the addition of particles is also effective for avoiding damage due to the contact with another commodity.

When the haze value of the antireflection film of the present invention exceeds 10% by the addition of the matting agent particles, the film seems white and has lowered clearness under strong light owing to transmission and scattering of reflected light. In addition, when such a film is disposed over the surface of an image display device, picture elements are enlarged by a lens effect of the surface roughness formed by the addition of matting agent particles, leading to glaring. The haze value is therefore set at 10% or less, more preferably 7% or less, especially preferably 5% or less, most preferably 3% or less.

The matting agent particles to be used in the present invention have an average particle size of from 0.3 µm or greater but not greater than 20 m, more preferably from 0.3 µm or greater but not greater than 10 µm, especially preferably from 0.5 µm or greater but not greater than 5 µm.

When the matting agent particles are added to the high refractive index layer of the present invention, the thickness of the high refractive index layer is preferably adjusted to 70% or greater but not greater than 200% of the average particle size of the matting agent particles in order to decrease the surface roughness and suppress the haze value. When the film thickness becomes greater than the average particle size of the matting agent particles, the particle size distribution of the matting agent particles is widened to incorporate the particles of a larger particle size in the layer. The film thickness is more preferably 75% or greater but not greater than 180%, still more preferably 80% or greater but not greater than 150%, especially preferably 80% or greater but not greater than 120%, of the average particle size of the matting agent particles.

The center line average surface roughness Ra within the plane of the surface of the antireflection film of the present invention is preferably from 0.003 µm or greater but not greater than 0.10 µm, more preferably from 0.005 µm or greater but not greater than 0.08 µm, especially preferably from 0.007 µm or greater but not greater than 0.05 µm, most preferably from 0.008 µm or greater but not greater than 0.04 µm. This surface roughness can be measured by three-dimensional surface roughness meter, atomic microscope, laser interference microscope, or the like method.

The matting agent particles of the present invention can suppress interference unevenness in the high refractive index layer, thereby suppressing irregular color by protruding from the surface of the high refractive index layer and imparting the surface with irregularities. If the density of irregularities is too low, glaring caused by the lens effect of the surface roughness becomes worse. If the density of the matting agent particles is too high, on the other hand, the film is tinged with white by scattering on the surface. Accordingly, the number of the matting agent particles protruding from the surface is preferably from 5000 particles/mm² or greater but not greater than 100000 particles/mm², more preferably from 7000 particles/mm² or greater but not greater than 50000 particles/mm², especially preferably from 8000 particles/mm² or greater but not greater than 40000 particles/mm². The number of the matting agent particles protruding from the surface can be determined by photographing the surface by an optical microscope or electron microscope and counting the number of the convex portions of the matting agent particles.

The particle size distribution of the matting agent particles of the present invention is preferably as narrow as possible, because if so, irregularities due to the matting agent particles can be formed uniformly and densely on the surface.

The particle size can be expressed by the value S calculated in accordance with the below-described equation (I). The smaller the value S, the narrower particle size distribution the particles have.

$$S=[D(0.9)-D(0.1)]/D(0.5) \qquad \text{Equation (I):}$$

wherein, in the formula (I), D(0.1), D(0.5) and D(0.9) are as defined below:

D(0.1): 10% of the integrated value of the volume-equivalent particle size

D(0.5): 50% of the integrated value of the volume-equivalent particle size

D(0.9): 90% of the integrated value of the volume-equivalent particle size is 1.5 or less.

In the matting agent particles of the present invention, the value S value preferably 1.5 or less, more preferably 1.3 or less, especially preferably 1.1 or less.

When the matting agent particles have narrow particle size distribution with the value S of 1.1 or less, the thickness of the high refractive index layer is particularly preferably 80% or greater but not greater than 120% of the average particle size of the matting agent particles.

The particle size distribution can be measured by the Coulter counter method, centrifugal separation method, laser diffraction-scattering method or electron microscopic observation method. The particle size and particle size distribution in the present invention are expressed by the volume-equivalent particle size (diameter of a sphere having the same volume as the particle). For the measurement, usable are "Multisizer" (produced by Malvern Instruments), "Coulter Counter N4" (produced by Beckman Coulter, Inc.) and the like.

As the matting agent particles of the present invention, particles of a resin or inorganic compound are usable. For example, silica particles, $TiO_2$ particles, alumina particles, zirconia particles, crosslinked acrylic particles, crosslinked polystyrene particles, melamine resin particles, benzoguanamine resin particles, phenol resin particles, resorcinol resin particles, polyamide resin particles and polyimide resin particles are preferably employed. The particles may be in either one of true sphere form or amorphous form. Two or more different particles may be used in combination.

The matting agent particles of the present invention have preferably a refractive index of 1.5 or greater but not greater than 2.7, more preferably 1.55 or greater but not greater than 2.2, especially preferably 1.60 or greater but not greater than 2.0, most preferably 1.62 or greater but not greater than 1.90.

The refractive index of the matting agent particles of the present invention is preferably within ±0.05, more preferably ±0.03 or less, especially preferably ±0.02 or less, each of the refractive index of the high refractive index layer in order to reduce light scattering between the matting agent particles and binder.

The term "refractive index of the high refractive index layer" as used herein means a refractive index of a layer formed by the materials (binder polymer, inorganic fine particles, matting agent particles and the like) constituting the high refractive index layer except the matting agent particles.

The internal haze of the high refractive index layer owing to light scattering between the binder and matting agent particles is preferably 2% or less, more preferably 1.5% or less, especially preferably 1% or less. Such an internal haze can be estimated by forming, over the high refractive index layer containing the matting agent, a layer free of the matting agent and having the same refractive index, thereby causing surface scattering to disappear.

[Low Refractive Index Layer]

The low refractive index layer in the present invention is preferably formed using a fluorine-containing compound which is crosslinked by heat or ionizing radiation, inorganic or organic fine particles, a binder and the like. A layer having a void between particles or inside the particle, and a low refractive index layer formed by sol-gel method are also usable.

The low refractive index layer preferably has a low refractive index in consideration of an improvement in antireflection performance, but it is difficult to impart the low refractive index layer with sufficient strength. From the viewpoint of their balance, the refractive index of the low refractive index layer is preferably within a range of from 1.30 to 1.50, more preferably from 1.35 to 1.49. In addition, the refractive index of the low refractive index layer must be lower by 0.05 or greater but not greater than 2.0 than that of the high refractive index layer.

Examples of the crosslinkable fluorine-containing polymer compound for use in the low refractive index layer include perfluoroalkyl-containing silane compounds (such as (heptadecafluoro-1,1,2,2-tetradecyl)triethoxysilane) and fluorine-containing copolymers having, as constituent units thereof, a fluorine-containing monomer and a monomer for imparting a crosslinkable group.

The fluorine-containing polymer is preferably synthesized by the polymerization reaction of a fluorine-containing ethylenically unsaturated monomer. Specific examples of the fluorine-containing monomer include fluoroolefins (such as fluoroethylene, vinylidene fluoride, tetrafluoroethylene, hexafluoroethylene, hexafluoropropylene, and perfluoro-2, 2-dimethyl-1,3-dioxol), partially or completely fluorinated alkyl ester derivatives of (meth)acrylic acid (such as "Biscoat 6FM" (produced by Osaka Organic Chemical Industry, Ltd.) and "M-2020" (produced by Daikin Industries, Ltd.)), completely or partially fluorinated vinyl ethers, and perfluoropolyether and derivatives thereof. An intended fluorine-containing polymer is available by the (co)polymerization of one monomer or plural monomers used in combination as any ratio.

As the fluorine-containing polymer, copolymers of the above-described fluorine-containing monomer and a monomer free of a fluorine atom may be used. No particular limitation is imposed on the monomer used in combination and examples include olefins (such as ethylene, propylene, isoprene, vinyl chloride and vinylidene chloride), acrylate esters (such as methyl acrylate, ethyl acrylate and 2-ethylhexyl acrylate), methacrylate esters (such as methyl methacrylate, ethyl methacrylate, butyl methacrylate and ethylene glycol dimethacrylate), styrene derivatives (such as styrene, divinylbenzene, vinyltoluene and α-methylstyrene), vinyl ethers (such as methyl vinyl ether), vinyl esters (such as vinyl acetate, vinyl propionate and vinyl cinnamate), acrylamides (such as N-tert-butylacrylamide and N-cyclohexylacrylamide), methacrylamides and acrylonitrile derivatives.

A polyorganosiloxane may be preferably introduced into the fluorine-containing polymer to impart slipping property. It may be attained by the polymerization of a polyorganosiloxane having, at the terminal thereof, an acrylic group, a methacrylic group, a vinyl ether group or styryl group, with the above-described monomer.

Examples of the monomer for imparting a crosslinkable group include, as well as (meth)acrylate monomers having, in the molecule thereof, a crosslinkable functional group in advance, such as glycidyl methacrylate, (meth)acrylate monomers having a carboxyl group, a hydroxyl group, an amino group or a sulfonic acid group (such as (meth)acrylic acid, methylol (meth)acrylate, hydroxyalkyl(meth)acrylate and allyl acrylate). In the latter case, a crosslinked structure can be introduced after the copolymerization, which is known in Japanese Patent Laid-Open No. Hei 10-25388 and Japanese Patent Application Laid-Open No. Hei 10-147739.

As the fluorine-containing polymer, commercially available materials are also usable. Examples of the commercially available fluorine polymer include "Cytop" (produced by Asahi Glass Co., Ltd.), "Teflon AF" (produced by DuPont), polyvinylidene fluoride, "Lumiflon" (produced by Asahi Glass Co., Ltd.) and "Opstar" (produced by JSR Corporation).

The low refractive index layer made of such a fluorine material has preferably a dynamic friction coefficient of from 0.03 to 0.15 and the contact angle of water thereon is preferably from 90 to 120°.

Addition of inorganic fine particles to the low refractive index layer made of the above-described fluorine material is preferred for improving strength. As the inorganic fine particles, amorphous ones are preferably used. They are preferably made of an oxide, nitride, sulfide or halide of a metal, of which the oxide is especially preferred. Preferred examples of the metal atom constituting these inorganic compounds include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni, with Mg, Ca, B and Si being more preferred. The inorganic compound may contain two metals. A particularly preferred inorganic compound is silicon dioxide, that is, silica.

The inorganic fine particles have preferably an average particle size of from 0.001 to 0.2 μm, more preferably from 0.005 to 0.05 μm. The particle size of the fine particles are preferably as uniform as possible (monodisperse or substantially monodisperse).

The inorganic fine particles are preferably added in an amount of from 5 to 90% by mass, more preferably from 10 to 70% by mass, especially preferably from 10 to 50% by mass, each based on the total mass of the low refractive index layer.

The inorganic fine particles are preferably used after surface treatment. The surface treatment can be classified into physical surface treatment such as plasma discharge treatment and corona discharge treatment, and chemical surface treatment with a coupling agent. In the present invention, chemical surface treatment using a coupling agent is preferred. As the coupling agent, organoalkoxy metal compounds (such as titanium coupling agents and silane coupling agents) are preferably used. If the inorganic fine particles are made of silica, the surface treatment with a silane coupling agent is particularly effective.

As the refractive index layer, a layer containing inorganic or organic fine particles and having microvoids formed between the particles or inside the particles is preferably used.

The microvoids between the particles can be formed by piling up two or more fine particles. Microvoids having a porosity of 26 volume % are formed between fine particles by the closest packing of spherical fine particles (completely monodisperse) having an equal particle size. Microvoids having a porosity of 48 volume % are formed between fine particles by the simple steric packing of spherical fine particles having an equal particle size. Owing to the particle size distribution of the fine particles and existence of microvoids in the particles, however, the porosity of the actual low refractive index layer fluctuates widely from the above-described theoretical value.

The refractive index of the low refractive index layer can be reduced by increasing the porosity. The size of the microvoids between particles can easily be adjusted to an adequate value (which causes neither light scattering nor problem in the strength of the low refractive index layer) by forming the microvoids by piling up the fine particles and controlling the particle size of the fine particles. Moreover, an optically uniform low refractive index layer which is also uniform in the size of the microvoids between particles is available by making the particle size of the fine particles uniform. This makes it possible to form the low refractive index layer to be a micro-void-containing porous film microscopically and a uniform film optically or macroscopically.

The microvoids between particles are preferably closed within the low refractive index layer by the fine particles and polymer. Light scattering on the surface of the low refractive index layer toward which voids are closed is smaller than that on the surface of the low refractive index toward which voids are open.

By forming microvoids, a macroscopic refractive index of the low refractive index layer becomes lower than the sum of the refractive indices of the components constituting the low refractive index layer. The refractive index of the layer corresponds to the sum of the refractive indices per volume of the constituents of the layer. The constituents of the low refractive index layer such as fine particles and polymer have a refractive index greater than 1, while the air has a refractive index of 1.00. So, formation of microvoids makes it possible to form a low refractive index layer having a markedly low refractive index.

The average particle size of the fine particles is preferably from 0.5 to 200 nm, more preferably from 1 to 100 nm, still more preferably from 3 to 70 nm, most preferably from 5 to 40 nm. The particle size of the fine particles is preferably as uniform as possible (monodisperse).

As the inorganic fine particles, those made of an oxide, nitride, sulfide or halide of a metal are preferred, with oxides and halides being especially preferred and oxides and fluorides being most preferred. Preferred examples of the metal atom constituting these inorganic compounds include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni, with Mg, Ca, B and Si being more preferred. The organic fine particles are preferably amorphous. Inorganic compounds containing two metals may be used. A particularly preferred inorganic compound is silicon dioxide, that is, silica.

Microvoids in the inorganic fine particles can be formed, for example, crosslinking the molecules of silica forming the particles. When the molecules of silica are crosslinked, its volume reduces and particles become porous.

The (porous) inorganic fine particles having microvoids can be directly synthesized as a dispersion by the sol-gel method (as described in Japanese Patent Laid-Open No. Sho 53-112732, or Japanese Patent Publication No. Sho 57-9051) or the precipitation method (as described in "APPLIED OPTICS", 27, 3356(1988)). The dispersion is also available by mechanically pulverizing the powder obtained by the drying•precipitation method. Commercially available porous inorganic fine particles (such as sol of silicon dioxide) are also usable.

For the formation of the low refractive index layer, the microvoids-containing inorganic fine particles are preferably used in the form dispersed in a proper medium. Preferred examples of the dispersing medium include water, alcohols (such as methanol, ethanol and isopropyl alcohol) and ketones (such as methyl ethyl ketone and methyl isobutyl ketone).

The organic fine particles are preferably polymer fine particles synthesized by the polymerization reaction (such as emulsion polymerization) of a monomer. These organic fine particles are also preferably amorphous. The polymer organic fine particles preferably contain a fluorine atom. A percentage of the fluorine atom in the polymer is preferably from 35 to 80% by mass, more preferably from 45 to 75% by mass. It is also preferred to form microvoids in the organic fine particles by crosslinking the polymer constituting the particles, thereby reducing the volume. In order to crosslink the polymer forming the particles, use of a polyfunctional monomer in an amount of at least 20 mole % of the monomer for synthesizing the polymer is preferred. This ratio of the polyfunctional monomer is more preferably from 30 to 80 mole %, most preferably from 35 to 50 mole %.

Examples of the fluorine-containing monomer to be used for the synthesis of the above-described organic fine particles and to be used for the synthesis of the fluorine-containing polymer include fluoroolefins (such as fluoroethylene, vinylidene fluoride, tetrafluoroethylene, hexafluoropropylene, and perfluoro-2,2-dimethyl-1,3-dioxole), fluorinated alkyl esters of acrylic acid or methacrylic acid, and fluorinated vinyl ethers.

Copolymers of a fluorine-containing monomer and a fluorine-free monomer may be used in combination.

Examples of the fluorine-free monomer include olefins (such as ethylene, propylene, isoprene, vinyl chloride, and vinylidene chloride), acrylic esters (such as methyl acrylate, ethyl acrylate, and 2-ethylhexyl acrylate), methacrylic esters (such as methyl methacrylate, ethyl methacrylate, and butyl methacrylate), styrene and its derivatives (such as styrene, vinyltoluene, and α-methylstyrene), vinyl ethers (such as methylvinyl ether), vinyl esters (such as vinyl acetate and vinyl propionate), acrylamides (such as N-tert-butylacrylamide and N-cyclohexylacrylamide), methacrylamides, and acrylonitriles.

Examples of the polyfunctional monomer include dienes (such as butadiene and pentadiene), esters of a polyol and acrylic acid (such as ethylene glycol diacrylate, 1,4-cyclohexane diacrylate, and dipentaerythritol hexaacrylate), esters of a polyol and methacrylic acid (such as ethylene glycol dimethacrylate, 1,2,4-cyclohexane tetramethacrylate and pentaerythritol tetramethacrylate), divinyl compounds (such as divinylcyclohexane and 1,4-divinylbenzene), divinylsulfone, bisacrylamides (such as methylene bisacrylamide) and bismethacrylamides.

The void-containing low refractive index layer preferably contains 5 to 50% by mass of a polymer. The polymer serves to adhere fine particles each other and maintain the structure of the low refractive index layer containing voids. The amount of the polymer is adjusted to maintain the strength of the low refractive index layer without filling the voids. The amount of the polymer is preferably from 10 to 30% by mass based on the total amount of the low refractive index layer.

It is preferred to adhere the polymer and the fine particles for imparting the low refractive index layer with necessary strength. Preferred examples of the method include:

(1) a method of binding the polymer to a surface treatment agent for the fine particles, (2) a method of using fine particles as a core and forming a polymer shell at the periphery of the fine particles, and (3) a method of using the polymer as the binder between fine particles.

The polymer to be bound with a surface treatment agent of (1) is preferably the shell polymer of (2) or binder polymer of (3).

The polymer of (2) is preferably formed at the periphery of the fine particles by the polymerization reaction prior to the preparation of a coating solution of the low refractive index layer.

The polymer of (3) is preferably formed by adding a monomer to a coating solution of the low refractive index layer and carrying out polymerization reaction simultaneously with or after application of the low refractive index layer. Of these methods (1) to (3), two or three methods are preferably used in combination. Use of the two methods (1) and (3), or the three methods (1) to (3) in combination is particularly preferred.

The above-described methods are described in detail in Japanese Patent Application Laid-Open No. Hei 11-6902.

As a raw material for the low refractive index layer, hydrolyzed partial condensates (so-called sol-gel films) of an organometal compound such as organosilane are also preferred. Of these, hydrolyzed partial condensates of an organosilane are preferred because of a low refractive index and high film strength, of which photocuring hydrolyzed partial condensates of an organosilane are more preferred.

Specific examples of the organosilane include tetramethoxysilane, tetraethoxysilane, tetraisopropoxysilane, tetra-n-butoxysilane, methyltrimethoxysilane, methyltriethoxysilane, ethyltrimethoxysilane, vinyltrimethoxysilane, vinyltriethoxysilane, phenyltrimethoxysilane, phenyltriethoxysilane, $CF_3CH_2CH_2Si(OCH_3)_3$, $CF_3(CF_2)_5CH_2CH_2Si(OCH_3)_3$, γ-glycidoxypropyltrimethoxysilane, γ-glycidoxypropyltriethoxysilane, γ-aminopropyltrimethoxysilane, γ-trimethoxysilylpropyl isocyanate, γ-mercaptopropyltrimethoxysilane, γ-methacryloxypropyltrimethoxysilane, γ-acryloxypropyltrimethoxysilane, dimethyldimethoxysilane, dimethyldiethoxysilane, γ-glycidoxypropylmethyldimethoxysilane, γ-aminopropylmethyltriethoxysilane, γ-mercaptopropylmethyldimethoxysilane and γ-methacryloxypropylmethyldimethoxysilane. The present invention is however not limited to these examples.

It is the common practice to use, as a mixture, plural organosilanes which are different each other. They are mixed while adjusting as needed for the purpose of controlling hardness and fragility, and introducing a functional group.

The hydrolysis condensation reaction of the organosilane can be conducted in a solventless manner or in a solvent. Organic solvents are preferred as the solvent. Examples include acetone, methyl ethyl ketone, methyl isobutyl ketone, ethyl acetate, butyl acetate, methanol, ethanol, isopropyl alcohol, butanol, toluene, xylene, tetrahydrofuran and 1,4-dioxane.

The hydrolysis condensation reaction is preferably conducted in the presence of a catalyst. Examples of the catalyst include inorganic acids such as hydrochloric acid, sulfuric acid and nitric acid, organic acids such as oxalic acid, acetic acid, formic acid, methanesulfonic acid and toluenesulfonic acid, inorganic bases such as sodium hydroxide, potassium hydroxide and ammonia, organic bases such as triethylamine and pyridine, metal alkoxides such as triisopropoxyaluminum and tetrabutoxyzirconium, and metal chelate compounds of the metal alkoxide with ethyl acetoacetate, acetylacetone or the like.

The hydrolysis condensation reaction is conducted by adding water in an amount of from 0.3 to 2.0 moles, preferably from 0.5 to 1.0 mole per mole of an alkoxy group and stirring at 25 to 100° C. in the presence of the above-described solvent and catalyst. The amount of the catalyst is from 0.01 to 10 mole %, preferably from 0.1 to 5 mole % based on the alkoxy group. The reaction conditions are preferably adjusted as needed, depending on the reactivity of the organosilane.

When the hydrolysate of an organosilane and/or partial condensate thereof, so called sol-gel component (which will be hereinafter be adopted), is made photocuring, the sol-gel component preferably contains a compound capable of generating a reaction accelerator by light. More specifically, a photoacid generator or photobase generator is preferred. Either one can accelerate the condensation reaction of the sol-gel component. Specific examples of the photoacid generator include benzoin tosylate, tri(nitrobenzyl)phosphate, diaryliodonium salt and triarylsulfonium salt, while those of the photobase generator include nitrobenzylcyclohexyl carbamate and di(methoxybenzyl)hexamethylene dicarbamate. Of these, the photoacid generators, more specifically, triarylsulfonium salt, and diaryliodonium salt are more preferred. A sensitizing dye can preferably be used in combination with these compounds.

The amount of the compound which is used in the present invention and capable of generating a reaction accelerator by light is preferably from 0.1 to 15%, more preferably from 0.5 to 5% based on the whole solid content of the coating solution of the low refractive index layer.

For the low refractive index layer of the present invention comprising the sol-gel component, the above-described fluorine-containing polymer may preferably be added in order to impart antifouling property and slipping property. As the fluorine-containing polymer, a polymer available by the polymerization of a fluorine-containing vinyl monomer is preferred and a polymer having a functional group capable of forming a covalent bond with the sol-gel component is more preferred from the viewpoints of the compatibility with the sol-gel component and film strength.

[Preparation Method of Antireflection Film, and Others]

In addition to the above-described components (inorganic fine particles, polymer, dispersing medium, polymerization initiator, and polymerization promoter), each layer of the antireflection film or the coating solution therefor may contain a polymerization inhibitor, leveling agent, thickener, anti-coloring agent, ultraviolet absorber, silane coupling agent, anti-static agent, and adhesion imparting gent.

Each layer of the antireflection film can be formed by coating such as dip coating, air knife coating, curtain coating, roller coating, wire bar coating, gravure coating, and extrusion coating (U.S. Pat. No. 2,681,294). Two or more layers may be simultaneously formed by coating. The method for simultaneous coating is described in U.S. Pat. Nos. 2,761,791, 2,941,898, 3,508,947, and 3,526,528; and Yuji Harazaki, "Coating Kogaku" pp.253, Asakura Shoten (1973).

In the present invention, interference can be estimated by measuring the reflectance.

The "reflectance" here can be determined by measuring a mean reflectance or the like on the mirror surface or integrating sphere at a wavelength from 450 nm to 650 nm.

The antireflection film may be subjected to surface treatment. Examples of such surface treatment include chemical treatment, mechanical treatment, corona discharge treatment, flame treatment, UV treatment, high frequency treatment, glow discharge treatment, active plasma treatment, laser treatment, mix acid treatment, and ozone-oxidation treatment. The surface treatment may be conducted on the transparent support or after application thereto of each layer of the antireflection film. In order to adhere the antireflection film of the present invention to a polarizing plate, the antireflection film may preferably be made hydrophilic. Alkali treatment is particularly suited for it. When the antidazzle antireflection film of the present invention uses triacetyl cellulose (TAC) as the transparent support and is used for LCD, this "alkali treatment" is usually known as "saponification" and enables adhesion between TAC and the polarizing plate base.

No particular limitation is imposed on the method of alkali treatment insofar as it is a method of dipping in an aqueous alkali solution. The alkali treatment conditions are controlled as needed within an extent not causing a large change in the surface shape of the antireflection film. Examples of the aqueous alkali solution include aqueous sodium hydroxide solution, aqueous potassium hydroxide solution and aqueous ammonia solution, with an aqueous sodium hydroxide solution being preferred. The concentration of the aqueous alkali solution is preferably from 0.1 to 25%, more preferably from 0.5 to 15%. The alkali treatment is conducted at from 10 to 80° C., preferably from 20 to 60° C., for from 5 seconds to 5 minutes, preferably from 30 seconds to 3 minutes. The film after the alkali treatment is preferably neutralized with acidic water and then rinsed sufficiently with water. The film after rinsed with water is provided for the subsequent step after sufficient drying.

The saponification as descried above may be conducted in any one of the following stages, that is, after the formation of the antireflection film of the present invention, in the form of the transparent support prior to the formation of the antireflection film, and on the way to form the antireflection film.

Peeling of the antireflection film, and change in optical properties or physical properties can be prevented by employing either one of the following saponification methods, that is, saponification of only a side opposite to the surface side on which the antireflection film has been formed while laminating one side, and saponification by applying the aqueous alkali solution only to the surface which is to be saponified.

The antireflection film can be used for an image display device such as a liquid crystal display device (LCD), a plasma display panel (PDP), an electroluminescence display (ELD) or a cathode ray tube display device (CRT). In CRT, PDP, ELD or the like, adhesion of the antireflection film having the transparent support is preferably carried out by adhering the transparent support side to the image display surface of such an image display device directly or via another functional film.

When the antireflection film is used for LCD, it is preferred that the transparent support side of it is adhered to a protecting film of a polarizing plate or directly to the polarizing plate via an adhesive layer; or the antireflection surface is disposed on the outermost layer of the image display surface by adhering the transparent substrate side of the antireflection film directly to the polarizing plate. Of them, use of the antireflection film of the present invention as at least one of the two protecting films of the deflecting layer is most preferred. By using the antireflection film of the present invention for the outermost layer, the polarizing plate which is free from reflection of external light and excellent in scratch resistance and antifouling property is available. In the polarizing plate of the present invention, the antireflection film also serves as a protecting film, whereby a production cost can be reduced.

EXAMPLES

The present invention will hereinafter be described in detail by Examples. It should however be borne in mind that the present invention is not limited to or by them.

Example 1

(Preparation of Matting Agent Particle Dispersions A to L)

To 80 parts by mass of methyl ethyl ketone were added 20 parts by mass of matting agent particles as shown in Table 1, followed by dispersion in a Polytron homogenizer or sand grinder, whereby dispersions A to L as shown in Table 1 were prepared. The volume-equivalent average particle size and particle size distribution S of the resulting dispersions were measured by "Multisizer" of Malvern Instruments. These results are shown in Table 1.

TABLE 1

(Details of the dispersion of matting agent particles)

| | Kind of particles | Refractive index of particles | Average particle size (μm) | Particle size distribution S |
|---|---|---|---|---|
| Dispersion A | SX-50H (crosslinked polystyrene) | 1.61 | 0.5 | 0.8 |
| Dispersion B | SX-130H (crosslinked polystyrene) | 1.61 | 1.3 | 1.0 |
| Dispersion C | SX-200H (crosslinked polystyrene) | 1.61 | 2.0 | 0.5 |
| Dispersion D | SX-350H (crosslinked polystyrene) | 1.61 | 3.5 | 0.8 |
| Dispersion E | SX-500H (crosslinked polystyrene) | 1.61 | 5.0 | 0.8 |

TABLE 1-continued (Details of the dispersion of matting agent particles)

| | Kind of particles | Refractive index of particles | Average particle size (μm) | Particle size distribution S |
|---|---|---|---|---|
| Dispersion F | SGP-100C (crosslinked polystyrene) | 1.61 | 25 | 1.3 |
| Dispersion G | MX-150H (PMMA) | 1.45 | 1.5 | 0.5 |
| Dispersion H | Epostar L-15 (benzoguanamine) | 1.68 | 13 | 1.4 |
| Dispersion I | Epostar MS (benzoguanamine) | 1.68 | 1.5 | 1.5 |
| Dispersion J | Eposter S6 (melamine) | 1.68 | 0.4 | 1.1 |
| Dispersion K | Eposter S (melamine) | 1.68 | 0.2 | 1.2 |
| Dispersion L | Eposter MS sifted product | 1.68 | 1.5 | 1.0 |

(Preparation of Coating Solution A for a High Refractive Index Layer)

In 439 g of a 50:50% by mass mixed solvent of methyl ethyl ketone and cyclohexanone were dissolved 125 g of a mixture of dipentaerythritol pentaacrylate and dipentaerythritol hexaacrylate (DPHA, produced by Nippon Kayaku Co., Ltd.) and 125 g of bis(4-methacryloylthiophenyl)sulfide (MPSMA, produced by Sumitomo Seika). To the resulting solution was added a solution obtained by dissolving 5.0 g of a photopolymerization initiator ("Irgacure 907", produced by Ciba-Geigy) and 3.0 g of a photosensitizer ("Kayacure DETX", produced by Nippon Kayaku Co., Ltd.) in 49 g of methyl ethyl ketone. The film obtained by application of the solution and ultraviolet curing had a refractive index of 1.60.

To the resulting solution was added each of the matting agent particle dispersions A to G shown in Table 1 to give a surface amount of the matting agent as shown in Table 2. The mixture thus obtained was filtered through a polypropylene filter having a pore size of 30 μm, whereby a coating solution A for a high refractive index layer was prepared.

(Preparation of Coating Solution B for High Refractive Index Layer)

To a mixed solvent of 104.1 g of methyl isobutyl ketone an 61.3 g of methyl ethyl ketone was added 217.0 g of an MIBK solution ("KZ-7114", produced by JSR Corporation) of a hard coat material containing a dispersion of zirconium dioxide particles having an average particle size of 20 nm while stirring by an air disper. To the resulting mixture was added a mixture of dipentaerythritol pentaacrylate and dipentaerythritol hexaacrylate ("DPHA", produced by Nippon Kayaku Co., Ltd.) so that the film obtained by application of the solution and ultraviolet curing would have a refractive index of 1.61.

To the resulting solution was added the matting agent particle dispersion shown in Table 1 so that the surface amount of the matting agent particles would be as shown in Table 2, followed by filtration through a polypropylene filter having a pore size of 30 μm, whereby a coating solution B for a high refractive index layer was prepared.

(Preparation of Coating Solution C for High Refractive Index Layer for Comparison)

In 439 g of methyl isobutyl ketone was dissolved 250 g of a mixture of dipentaerythritol pentaacrylate and dipentaerythritol hexaacrylate ("DPHA", produced by Nippon Kayaku Co., Ltd.). To the resulting solution was added a solution obtained by dissolving 7.5 g of a photopolymerization initiator ("Irgacure 907", produced by Ciba Geigy) and 5.0 g of a photosensitizer ("Kayacure-DETX", produced by Nippon Kayaku Co., Ltd.) in 49 g of methyl isobutyl ketone. The film obtained by application of the resulting solution and ultraviolet curing had a refractive index of 1.53.

To the resulting solution was added each of the matting agent particle dispersions shown in Table 1 so that the amount of the matting agent particles on the surface would be as shown in Table 2, followed by filtration through a polypropylene filter having a pore size of 30 μm, whereby a coating solution C for a high refractive index layer was prepared.

(Preparation of Coating Solution D for Low Refractive Index Layer)

To 210 g of a thermally-crosslinkable fluorine-containing polymer ("JN-7228", solid concentration: 6% by mass, produced by JSR Corporation) having a refractive index of 1.42 were added 15.2 g of silica sol ("MEK-ST", average particle size: 10 to 20 nm, solid concentration: 30% by mass, produced by Nissan Chemical Industries) and 174 g of methyl ethyl ketone. After stirring, the reaction mixture was filtered through a polypropylene filter having a pore size of 1 μm, whereby a coating solution D for a low refractive index layer was prepared.

(Preparation of Antireflection Film Sample)

The coating solution for a high refractive index layer obtained above was applied to a triacetyl cellulose film ("TAC-TD80U", produced by Fuji Photo Film Co., Ltd., refractive index: about 1.49) having a thickness of 80 μm to give a coating amount as shown in Table 2 by using a bar coater. After drying at 120° C., the coated layer was exposed to ultraviolet rays under illumination of 400 mW/cm$^2$ and a dose of 300 mJ/cm$^2$ by using an air-cooled metal halide lamp (Eyegraphics Co., Ltd.) of 160 W/cm in the atmosphere having an oxygen concentration of 2% or less upon nitrogen purging, whereby the coated layer was cured and a high refractive index layer was formed.

Over the high refractive index layer, the coating solution D for a low refractive index layer was applied by a bar coater. After drying at 80° C., the coating layer was thermally crosslinked at 120° C. for 10 minutes, whereby a low refractive index layer having a thickness of 0.096 μm was formed. The details of the samples 1-A to 1-T of the antireflection films thus formed are shown in Table 2.

TABLE 2

Example 1: Details of Samples

|  | Coating solution of high refractive index layer | Refractive Index of high refractive index layer | Dispersion of matting agent particles | Average particle size (μm) | Thickness of high refractive index layer/particle size of matting agent particles ratio | The number of matting agent particles on the surface (particles/mm$^2$) | Coating solution for low refractive index layer | Refractive index of low refractive index layer | Surface roughness Ra (μm) |
|---|---|---|---|---|---|---|---|---|---|
| Invention 1-A | A | 1.60 | A | 0.5 | 0.85 | 9000 | D | 1.42 | 0.04 |
| Invention 1-B | A | 1.60 | B | 1.3 | 0.85 | 9000 | D | 1.42 | 0.05 |
| Invention 1-C | A | 1.60 | C | 2.0 | 0.85 | 9000 | D | 1.42 | 0.05 |
| Invention 1-D | A | 1.60 | D | 3.5 | 0.85 | 9000 | D | 1.42 | 0.04 |
| Invention 1-E | A | 1.60 | E | 5.0 | 0.85 | 9000 | D | 1.42 | 0.06 |
| Comp. Ex. 1-F | A | 1.60 | F | 25 | 0.85 | 9000 | — | — | — |
| Comp. Ex. 1-G | A | 1.60 | C | 2.0 | 0.6 | 9000 | D | 1.42 | 0.18 |
| Invention 1-H | A | 1.60 | C | 2.0 | 0.75 | 9000 | D | 1.42 | 0.10 |
| Invention 1-I | A | 1.60 | C | 2.0 | 0.9 | 9000 | D | 1.42 | 0.08 |
| Invention 1-J | A | 1.60 | C | 2.0 | 1.0 | 9000 | D | 1.42 | 0.01 |
| Invention 1-K | A | 1.60 | G | 1.5 | 0.85 | 9000 | D | 1.42 | 0.05 |
| Invention 1-L | B | 1.61 | C | 2.0 | 0.85 | 9000 | D | 1.42 | 0.05 |
| Comp. Ex. 1-M | B | 1.61 | None | None | 0.85 | — | D | 1.42 | 0.001 |
| Invention 1-N | B | 1.61 | C | 2.0 | 0.85 | 4000 | D | 1.42 | 0.05 |
| Invention 1-O | B | 1.61 | C | 2.0 | 0.85 | 6000 | D | 1.42 | 0.06 |
| Invention 1-P | B | 1.61 | C | 2.0 | 0.85 | 18000 | D | 1.42 | 0.04 |
| Invention 1-Q | B | 1.61 | C | 2.0 | 0.85 | 30000 | D | 1.42 | 0.03 |
| Invention 1-R | B | 1.61 | C | 2.0 | 0.85 | 60000 | D | 1.42 | — |
| Invention 1-S | B | 1.61 | C | 2.0 | 0.85 | 120000 | D | 1.42 | — |
| Comp. Ex. 1-T | C | 1.53 | C | 2.0 | 0.85 | 9000 | D | 1.42 | 0.04 |

(Evaluation of Antireflection Film)

The antireflection film samples thus obtained were evaluated for the below-described items.

(1) Average Reflectance, Interference Width

A spectral reflectance at an incident angle of 5° in the wavelength region of 380 to 780 nm was measured using a spectrophotometer (manufactured by JASCO Corporation).

An average reflectance is an average of reflectances in the range from 450 to 650 nm.

As an index of the intensity of interference, a difference between the maximum value and minimum value of the interference wave at a wavelength of 550 nm was measured and this value was designated as an interference width.

(2) Refractive Index of Each Layer

In accordance with the measuring results of the reflectance, the refractive index of each layer was determined by conducting fitting calculation of the refractive index based on the multiwave interference by Fresnel reflection.

(3) Haze

The haze of the film obtained as described above was measured using a haze meter "MODEL 1001DP" (manufactured by Nippon Denshoku Industries, Co., Ltd.).

(4) Internal Haze

A haze was measured when the surface roughness was eliminated by applying a coating solution having the same refractive index with that of a high refractive index layer and being free of matting agent particles to a sample to which the high refractive index layer had been applied.

(5) Color

The film prepared as described above was adhered onto a polarizing plate and color of reflected light when viewed at different angles was judged visually.

○: having almost no color

○Δ: having a slight color

Δ: having a color but not problematic x: having a marked color change (6) Tinge of White The film prepared as described above was adhered to a polarizing plate and it was visually observed whether the surface was tinged with white.

○: clear with high transparency

○Δ: tinged slightly with white

Δ: tinged with white but not problematic x: tinged with white and inferior in transparency (7) Glare of Transmitted Light Each of the films thus formed was adhered to a liquid crystal cell having fineness as high as about 200 ppi (200 pixels per inch: 200 pixels in a 1-inch square) and the glare of transmitted light was evaluated according to the following criteria:

○: Glare was scarcely recognized.

Δ: Glare was slightly recognized.

x: Glare was obviously recognized.

(8) Friction With Steel Wool

The extent of scratches made by moving a steel wool #0000 back and forth 10 times under a load of 400 g applied to an area of a 10-yen coin was evaluated.

○: No scratches

Δ: Some scratches but not clear x: Severe scratches (9) Pencil Hardness

After the film formed as described above was allowed to stand for 2 hours under the conditions of temperature at 25° C. and relative humidity of 60%, it was scratched five times with a test pencil as prescribed in JIS S6006 under a load of 500 g in accordance with the pencil hardness evaluation method as prescribed in JIS K5400. Of the pencils which were recognized to make no scratches, the greatest pencil hardness was designated as the pencil hardness of the film.

In Table 3, evaluation results of the samples of the present invention and comparative samples described in Table 2 are shown. It was impossible to form an antireflection film by using, of the samples shown in Table 2, Comparative Sample 1-F for which matting agent particles having an average particle size of 25 μm had been used, because curling and film cracks appeared owing to an excessively thick binder film. Evaluation results of it are therefore not included in Table 3.

predetermined in the present invention exhibited high reflectance and therefore inferior in antiglare property.

Samples 1-G to 1-J have revealed that Invention Sample 1-H in which the thickness of the high refractive index layer is 70% or greater of the average particle size of the matting agent particles showed less tinge of white and Invention Samples 1-I and 1-J exhibited a lower haze and less color.

Samples 1-N to 1-S have revealed that Invention Samples 1-N and 1-O in which the number of the matting agent particles protruding from the high refractive index layer was 8000 particles/mm$^2$ or less were inferior in the glare test;

TABLE 3

Results of Example 1

| | Haze (%) | Internal haze (%) | Average reflectance (%) | Interference width | Color | Tinge of white | Glare | Friction with steel wool | Pencil hardness |
|---|---|---|---|---|---|---|---|---|---|
| Invention 1-A | 3.5 | 1.1 | 1.5 | 1.3 | Δ | ○Δ | ○ | ○ | H |
| Invention 1-B | 3.7 | 1.3 | 1.5 | 0.8 | ○ | ○Δ | ○ | ○ | 2H |
| Invention 1-C | 3.2 | 1.2 | 1.6 | 0.5 | ○ | ○Δ | ○ | ○ | 2H |
| Invention 1-D | 3.8 | 1.4 | 1.4 | 0.4 | ○ | ○Δ | ○ | ○ | 3H |
| Invention 1-E | 3.6 | 1.3 | 1.5 | 0.3 | ○ | ○Δ | ○ | ○ | 3H |
| Invention 1-G | 12.0 | 1.2 | 1.0 | 0 | ○ | x | Δ | ○ | 2H |
| Invention 1-H | 7.0 | 1.4 | 1.2 | 0.3 | ○ | Δ | Δ | ○ | 2H |
| Invention 1-I | 2.5 | 1.3 | 1.6 | 0.8 | ○ | ○ | ○ | ○ | 2H |
| Invention 1-J | 1.5 | 1.1 | 1.8 | 1.0 | ○Δ | ○ | ○ | ○ | 2H |
| Invention 1-K | 7.0 | 4.0 | 1.5 | 0.5 | ○ | Δ | ○ | ○ | 2H |
| Invention 1-L | 2.3 | 0.4 | 1.5 | 0.5 | ○ | ○ | ○ | ○ | 2H |
| Comp. Ex. 1-M | 0.3 | 0.1 | 1.8 | 1.5 | x | ○ | ○ | x | 2H |
| Invention 1-N | 1.5 | 0.3 | 1.6 | 0.6 | ○ | ○ | Δ | Δ | 2H |
| Invention 1-O | 2.0 | 0.4 | 1.6 | 0.5 | ○ | ○ | Δ | ○ | 2H |
| Invention 1-P | 2.5 | 0.5 | 1.5 | 0.5 | ○ | ○ | ○ | ○ | 2H |
| Invention 1-Q | 2.3 | 0.4 | 1.4 | 0.5 | ○ | ○ | ○ | ○ | 2H |
| Invention 1-R | 1.8 | 0.5 | 1.4 | 0.6 | ○ | ○ | ○ | ○ | H |
| Invention 1-S | 1.5 | 0.4 | 1.4 | 0.5 | ○ | ○ | ○ | ○ | HB |
| Comp. Ex. 1-T | 4.5 | 2.5 | 2.5 | 0.8 | ○ | Δ | ○ | ○ | H |

The evaluation results shown in Table 3 have revealed as follows.

The samples of the present invention exhibited good results in each of color and tinge of white.

In the test on tinge of white, Comparative Sample 1-G exhibiting a high haze value, on the other hand, showed inferior results. Comparative Sample 1-M free of matting agent particles was inferior in the tests on color and friction with steel wool. Comparative Sample 1-T in which a difference in the refractive index between the high refractive index layer and support was 0.04, smaller than a value predetermined in the present invention exhibited high reflectance and therefore inferior in antiglare property.

Invention Sample 1-N in which the number was 5000 particles/mm$^2$ or less showed bad results also in the test of the friction with steel wool; Invention Sample 1-R in which the number of the matting agent particles is 40000 particles/mm$^2$ or greater and Invention Sample 1-S in which the number of matting agent particles is 100000 particles/mm$^2$ or greater showed a low pencil hardness. The greater the number, the lower the pencil hardness.

Invention Sample 1-K in which a difference in refractive index between the high refractive index layer and matting agent particles is 0.05 or greater and has an internal haze as high as 4% showed not good results in tinge with white.

The surface roughness on the side of each of the invention samples to which the high refractive index layer and the low refractive index layer were applied was 0.003 μm or greater but not greater than 0.10 μm Example 2

In a similar manner to preparation of the coating solution B for a high refractive index layer in Example 1 except that the matting agent particle dispersions H to L shown in Table 1 were added to give the amount of the matting agent particles (the number of the matting agent particles protruding from the high refractive index layer) on the surface as shown in Table 4, followed by filtration through a polypropylene filter having a pore size of 30 μm, whereby coating solutions for a high refractive index layer were prepared.

In a similar manner to Example 1 except for the use of the resulting coating solutions instead, samples of an antireflection film shown in Table 4 were formed. Although the amount of the matting agent was fixed in Samples 2-B to 2-G and 2-J to 2-M, the number of matting agent particles protruding from the surface decreases with an increase in the film thickness of the high refractive index layer in Samples 2-B to 2-G exhibiting S=1.5, thus having a wide particle size distribution, while in Samples 2-J to 2-M exhibiting S=1.0, thus having a narrow particle size distribution, the number of the matting agent particles protruding from the surface hardly decreases with an increase in the thickness of the high refractive index layer.

In Table 5, evaluation results of Invention Samples and Comparative Samples in Table 4 are shown.

TABLE 4

Details (2) of Samples of Example 2

| | Coating solution of high refractive index layer | Refractive index of high refractive index layer | Dispersion of matting agent particles | Average particle size (μm) | Thickness of high refractive index layer/particle size of matting agent particles ratio | The number of matting agent particles on the surface (particles/mm²) | Coating solution for low refractive index layer | Refractive index of low refractive index layer |
|---|---|---|---|---|---|---|---|---|
| Invention 2-A | B | 1.68 | H | 13 | 1.5 | 9000 | D | 1.42 |
| Invention 2-B | B | 1.68 | I | 1.5 | 0.9 | 18000 | D | 1.42 |
| Invention 2-C | B | 1.68 | I | 1.5 | 1.0 | 15000 | D | 1.42 |
| Invention 2-D | B | 1.68 | I | 1.5 | 1.1 | 12000 | D | 1.42 |
| Invention 2-E | B | 1.68 | I | 1.5 | 1.2 | 9000 | D | 1.42 |
| Invention 2-F | B | 1.68 | I | 1.5 | 1.5 | 4000 | D | 1.42 |
| Invention 2-G | B | 1.68 | I | 1.5 | 2.2 | 1000 | D | 1.42 |
| Invention 2-H | B | 1.68 | J | 0.4 | 1.1 | 9000 | D | 1.42 |
| Comp. Ex. 2-I | B | 1.68 | K | 0.2 | 1.1 | 9000 | D | 1.42 |
| Invention 2-J | B | 1.68 | L | 1.5 | 0.75 | 12000 | D | 1.42 |
| Invention 2-K | B | 1.68 | L | 1.5 | 0.85 | 12000 | D | 1.42 |
| Invention 2-L | B | 1.68 | L | 1.5 | 1.0 | 12000 | D | 1.42 |
| Invention 2-M | B | 1.68 | L | 1.5 | 1.1 | 12000 | D | 1.42 |
| Invention 2-N | B | 1.68 | L | 1.5 | 1.3 | 12000 | D | 1.42 |

TABLE 5

Results of Example 2

| | Haze (%) | Internal haze (%) | Average reflectance (%) | Interference width | Color | Tinge with white | Glare | Friction with steel wool | Pencil hardness |
|---|---|---|---|---|---|---|---|---|---|
| Invention 2-A | 4.0 | 0.6 | 1.5 | 0.4 | ○ | ○Δ | ○ | ○ | 3H |
| Invention 2-B | 8.0 | 0.5 | 1.5 | 0.1 | ○ | Δ | ○ | ○ | 2H |
| Invention 2-C | 6.0 | 0.7 | 1.6 | 0.3 | ○ | ○Δ | ○Δ | ○ | 2H |
| Invention 2-D | 4.0 | 0.9 | 1.4 | 0.5 | ○ | ○Δ | Δ | ○ | 2H |
| Invention 2-E | 2.5 | 0.8 | 1.5 | 0.8 | ○ | ○ | Δ | ○ | 2H |
| Invention 2-F | 1.5 | 0.6 | 1.0 | 1.0 | ○ | ○ | Δ | ○ | 3H |
| Invention 2-G | 0.6 | 0.5 | 1.2 | 1.3 | Δ | ○ | Δx | ○ | 3H |
| Invention 2-H | 3.0 | 0.7 | 1.6 | 1.2 | ○ | ○ | ○ | ○ | H |
| Comp. Ex. 2-I | 2.8 | 0.8 | 1.8 | 1.5 | x | ○ | ○ | ○ | HB |

TABLE 5-continued

Results of Example 2

| | Haze (%) | Internal haze (%) | Average reflectance (%) | Interference width | Color | Tinge with white | Glare | Friction with steel wool | Pencil hardness |
|---|---|---|---|---|---|---|---|---|---|
| Invention 2-J | 6.0 | 0.7 | 1.5 | 0.1 | ○ | ○Δ | ○ | ○ | 2H |
| Invention 2-K | 3.0 | 0.8 | 1.5 | 0.4 | ○ | ○ | ○ | ○ | 2H |
| Invention 2-L | 2.2 | 0.6 | 1.7 | 0.7 | ○ | ○ | ○ | ○ | 2H |
| Invention 2-M | 1.5 | 0.6 | 1.8 | 0.9 | ○ | ○ | ○ | ○ | 3H |
| Invention 2-N | 0.9 | 0.5 | 1.8 | 1.2 | ○Δ | ○ | ○ | ○ | 3H |

What have been understood from Tables 4 and 5 will next be described.

Samples of the invention all exhibited good evaluation results both in color and tinge with white.

Comparative Sample 2-I in which the average particle size of the matting agent particles is less than 0.3 μm is, on the other hand, inferior in color evaluation owing to a thin film thickness of the high refractive index layer.

When the matting agent particles exhibiting S=1.5, thus having a wide particle size distribution, the film thickness of the high refractive index layer must be made greater than the particle size of the matting agent particles. Invention Sample 2-G in which the film thickness corresponds to 200% or greater of the particle size of the matting agent particles is a little inferior in the evaluation results of color and glare. Invention Samples 2J to 2N in which the matting agent particles exhibiting S=1.0, thus having a narrow particle size distribution, on the other hand, exhibited good results in the color, tinge with white and glare. Particularly when the thickness of the high refractive index layer falls within a range of from 0.8 to 1.2 (80% to 120%) of the average particle size of the matting agent particles, the samples exhibit good performance.

Invention Sample 2-A in which the matting agent particles have a particle size of 13 μm formed a large curl.

In the next place, after alkali treatment of the antireflection films of Invention Samples 1-P and 2L, they were cut into antireflection polarizing plates, respectively. By using each of these polarizing plates, a liquid crystal display device having the antireflective layer (low refractive index layer) disposed as an outermost layer was formed. The device thus formed was used as a liquid crystal device featuring less color due to reflected light, less glare from external light, no tinge of white even under external light in the daytime and high visibility.

When the polarizing plate was attached to a liquid crystal display device of a high resolution (200 ppi), good visibility was attained without glare.

INDUSTRIAL APPLICABILITY

The antireflection films of the present invention feature a low reflectance and a less color due to interference and at the same time, their tinge of white and glare are suppressed. Use of these films therefore makes it possible to provide an image display device which overcomes the problems of a color due to reflection, tinge with white and glare and in addition, has good visibility without much reflection of external light.

The invention claimed is:

1. An antireflection film comprising a transparent support, at least one high refractive index layer having a refractive index higher by 0.05 or greater but not greater than 1.5 than that of the transparent support, and a low refractive index layer having a refractive index lower by 0.05 or greater but not greater than 2.0 than that of the high refractive index layer, wherein
    the high refractive index layer comprises matting agent particles having an average particle size of 0.5 μm or greater but not greater than 5 μm, and inorganic fine particles having an average particle size of from 1 nm to 100 nm, wherein the inorganic fine particles are present in an amount of from 10% to 90% by mass based on the total mass of the high refractive index layer,
    the thickness of the high refractive index layer is 80% or greater but not greater than 120% of the average particle size of the matting agent particles,
    the center line average surface roughness on a surface of the antireflection film is 0.003 μm or greater but not greater than 0.10 μm,
    the film has a haze value of 10% or less, and
    the number of the matting agent particles which protrude from the high refractive index layer falls within a range of from 8000 particles/mm$^2$ or greater but not greater than 40000 particles/mm$^2$.

2. The antireflection film according to claim 1, wherein a refractive index of the matting agent particles falls within a range of ±0.05 of the refractive index of the high refractive index layer.

3. The antireflection film according to claim 1, wherein the refractive index of the high refractive index layer is 1.6 or greater but not greater than 2.0.

4. The antireflection film according to claim 1, wherein an internal haze of the high refractive index layer is 2% or less.

5. The antireflection film according to claim 1, wherein the transparent support is made by triacetyl cellulose.

6. A polarizing plate comprising the antireflection film according to claim 1 over at least one side of the polarizing plate.

7. An image display device, which comprises, on an image display surface thereof, an antireflection film comprising a transparent support, at least one high refractive index layer having a refractive index higher by 0.05 or greater than that of the transparent support and a low refractive index layer having a refractive index lower by 0.05 or greater than that of the high refractive index layer, wherein the high refractive index layer comprises matting agent particles having an average particle size of 0.5 µm or greater but not greater than 5 µm, and inorganic fine particles having an average particle size of from 1 nm to 100 nm, wherein the inorganic fine particles are present in an amount of from 10% to 90% by mass based on the total mass of the high refractive index layer, the thickness of the high refractive index layer is 80% or greater but not greater than 120% of the average particle size of the matting agent particles, the center line average surface roughness on a surface of the antireflection film is 0.003 µm or greater but not greater than 0.10 µm, the film has a haze value of 10% or less, and the number of the matting agent particles which protrude from the high refractive index layer falls within a range of from 8000 particles/mm$^2$ or greater but not greater than 40000 particles/mm$^2$.

* * * * *